(12) United States Patent
Sinicrope

(10) Patent No.: US 8,537,810 B2
(45) Date of Patent: Sep. 17, 2013

(54) E-TREE USING TWO PSEUDOWIRES BETWEEN EDGE ROUTERS WITH ENHANCED LEARNING METHODS AND SYSTEMS

(75) Inventor: David Sinicrope, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 144 days.

(21) Appl. No.: 13/251,167

(22) Filed: Sep. 30, 2011

(65) Prior Publication Data

US 2013/0003737 A1    Jan. 3, 2013

Related U.S. Application Data

(60) Provisional application No. 61/502,501, filed on Jun. 29, 2011, provisional application No. 61/502,505, filed on Jun. 29, 2011.

(51) Int. Cl.
*H04L 12/66* (2006.01)

(52) U.S. Cl.
USPC .......................... 370/352; 370/353; 370/392

(58) Field of Classification Search
USPC .......................................... 370/352, 353, 392
See application file for complete search history.

(56) References Cited

U.S. PATENT DOCUMENTS

| 8,385,355 | B1 * | 2/2013 | Figueira et al. | ............... 370/401 |
|---|---|---|---|---|
| 2011/0164617 | A1 | 7/2011 | Yong | |

OTHER PUBLICATIONS

R. Ram, Extension to LDP-VPLS for E-Tree Using Two PW draft-ram-l2vpn-ldp-vpls-etree-2pw-02.txt, May 18, 2011, IETF Network Working Group, pp. 1-9.*
Ram, R., et al., "Extension to LDP-VPLS for E-Tree Using Two PW; draft-ram-l2vpn-ldp-vpls-etree-2pw-02.txt", Network Working Group, Internet Draft, Category: Standard Track, May 18, 2011, 10 pages.
Marc Lasserre et al., "Virtual Private LAN Service (VPLS) Using Label Distribution Protocol (LDP) Signaling," Network Working Group, Request for Comments 4762, Jan. 2007, 31 pages, The IETF Trust.
Rafi Ram et al., "Extension to LDP-VPLS for E-Tree Using Two PW draft-ram-l2vpn-ldp-vpls-etree-2pw-02.txt," Network Working Group, Internet Draft, May 18, 2011, 9 pages.
Raymond Key et al., "Requirements for MEF E-Tree Support in VPLS draft-key-l2vpn-vpls-etree-reqt-03," Network Working Group, Internet Draft, Apr. 2, 2011, 14 pages, IETF Trust and the persons identified as the document authors.

(Continued)

*Primary Examiner* — Huy D Vu
*Assistant Examiner* — Kuo T Chiang
(74) *Attorney, Agent, or Firm* — Blakely Sokoloff Taylor & Zafman LLP

(57) ABSTRACT

An e-tree service that includes establishing two pseudowires (PW) between edge network elements with enhanced address learning is described. In one embodiment, a root PW and a leaf PW are used for carrying packets from a root node and from a leaf node, respectively. When a network element receives a packet on the root PW, the network element associates the source Media Access Control (MAC) address of the packet with the logical port associated with the root PW in a root PW MAC address table, and also associates the source MAC address with the logical port associated with the leaf PW in a leaf PW MAC address table. When a network element receives a packet on the leaf PW, the network element associates the source MAC address of this packet with the logical port that is associated with the root PW in the root PW MAC address table.

28 Claims, 10 Drawing Sheets

(56) References Cited

OTHER PUBLICATIONS

Simon Delord et al., "Control Word Reserved bit for use in E-Tree draft-delord-pwe3-cw-bit-etree-05," Network Working Group, Internet Draft, Apr. 15, 2011, 9 pages, IETF Trust and the persons identified as the document authors.

Non-Final Office Action, U.S. Appl. No. 13/251,162, dated Apr. 23, 2013, 31 pages.

* cited by examiner

US 8,537,810 B2

E-TREE USING TWO PSEUDOWIRES BETWEEN EDGE ROUTERS WITH ENHANCED LEARNING METHODS AND SYSTEMS

CROSS-REFERENCE TO RELATED APPLICATIONS

This application claims the benefit of U.S. Provisional Application No. 61/502,501, filed Jun. 29, 2011 and U.S. Provisional Application No. 61/502,505, filed Jun. 29, 2011, which are hereby incorporated by reference.

FIELD

Embodiments of the invention relate to the field of networking; and more specifically, to an e-tree service network.

BACKGROUND

E-tree is an Ethernet service defined by Metro Ethernet Forum (MEF) as a particular rooted multipoint form of an Ethernet Local Area Network (LAN) service. In an e-tree service instance, there are two types of network nodes: (1) root nodes; and (2) leaf nodes. A packet sent by a root node may be delivered to other root nodes and other leaf nodes. However, a packet sent by a leaf node is restricted to be delivered only to root nodes in the e-tree service instance. In other words, a packet sent by a leaf node is not allowed to be delivered to another leaf node. A packet originating from a leaf node destined for another leaf node should not be delivered in an e-tree service instance.

Virtual Private LAN Service (VPLS) is a way to provide Ethernet based multipoint to multipoint communication over Internet Protocol (IP)/Multiprotocol Label Switching (MPLS) networks. In conventional VPLS networks, for a given LAN service instance, each Provider Edge (network element PE) network element establishes a pseudowire (PW) to every other PE in the network to form a full mesh of PWs between all the PEs participating in the LAN service instance. A packet send from any network node may be delivered to any other network node. In this sense, all network nodes in a conventional VPLS network behave like a root node. Hence, in order to implement an e-tree service in a VPLS network, the network element PEs in the network must have a way to differentiate between packets originating from a root node and packets originating from a leaf node, such that any packet originating from a leaf node destined for another leaf node is not forwarded on by the network element PE.

One mechanism to differentiate between packets originating from a root node and packets originating from a leaf node is to modify a control word in each packet to identify the packet as originating from a root node or a leaf node. However, in order to process the modified control word in a network element PE, changes to existing network element PE's internal hardware are required, because the network element PE has to look up an extra field beyond the label stack to perform branching-decisions based on the contents of the control word to determine whether to forward the packet or not.

SUMMARY

Methods and apparatus for enhanced address learning and packet forwarding in an e-tree service instance implemented over an MPLS/PW network, referred to as an "e-tree service network," are described. According to one embodiment, two pseudowires (PW) are established between two edge network elements that are part of the e-tree service network: (1) a root PW for carrying packets that are sent from a root node network element; and (2) a leaf PW for carrying packets that are sent from a leaf node network element. Each of the edge network elements include a logical port associated with a leaf access circuit (AC) that is coupled to a local leaf node, a logical port associated with a root AC that is coupled to a local root node, a logical port associated with the root PW, and a logical port associated with the leaf PW. When a network element receives a packet with a source Media Access Control (MAC) address on the logical port associated with the root PW, responsive to receiving this packet, the network element associates the source MAC address with the logical port associated with the root PW in a root PW MAC address table, and also associates the source MAC address with the logical port associated with the leaf PW in a leaf PW MAC address table. When a network element receives a packet with a source MAC address on the logical port associated with the leaf PW, responsive to receiving this packet, the network element associates the source MAC address of this packet with the logical port that is associated with the root PW in the root PW MAC address table. When a network element receives a packet with a destination MAC address on the logical port associated with the leaf AC, responsive to determining that the destination MAC address is in the leaf PW MAC address table, the network element forwards the packet out the logical port as indicated in the leaf PW MAC address table.

According to another embodiment, an edge network element in an e-tree service network includes a set of one or more processors, and a memory coupled with the set of processors. The memory stores instructions that when executed by the set of processors, cause the set of processors to perform as follows. When the edge network element receives a packet with a source MAC address on a logical port associated with a root PW that is to couple the edge network element with another edge network element of the e-tree service, where the root PW is for carrying packets that are sent from a root network element in the e-tree service network, the edge network element associates the source MAC address with the logical port that is associated with the root PW in a root PW MAC address table, and also associates the source MAC address with the logical port associated with a leaf PW that is to couple the edge network element with the another edge network element in a leaf PW MAC address table, where the leaf PW is for carrying packets that are sent from a leaf network element in the e-tree service network. When the edge network element receives a packet with a source MAC address and a destination MAC address on the logical port associated with the leaf PW, the edge network element associates the source MAC address with the logical port that is associated with the root PW in the root PW MAC address table. When the edge network element receives a packet with a destination MAC address on the logical port associated with a leaf access circuit that is to couple the edge network element with a local leaf network element, responsive to determining that the destination MAC address is in the leaf PW MAC address table, the edge network element forwards the packet out on a logical port that is associated with the destination MAC address as indicated in the leaf PW MAC address table.

According to a further embodiment, a network element in an e-tree service network includes a root PW MAC address table, a leaf PW MAC address table, a learning module coupled to the PW MAC address tables, and a forwarding module coupled to the PW MAC address tables. The root PW MAC address table is configured to store a set of associations between logical ports of the network element and MAC addresses of the other network elements in the e-tree service network. The leaf PW MAC address table is configured to store another set of associations between the logical ports of the network element and the MAC addresses of the other network elements in the e-tree service network. The learning module is configured to capture source MAC addresses of packets received on the logical ports of the network element, and to associate the source MAC addresses with the logical ports of the network element in the root PW MAC address table and the leaf PW MAC address table based on a set of port association rules that includes at least one rule that associates a particular logical port with a particular source MAC address without receiving a packet with that particular source MAC address on that particular logical port. The forwarding module is configured to look up destination MAC addresses of the packets received at the network element in at least one of the PW MAC address tables, and to determine whether to forward or to discard each of the packets based on at least one of the set of associations stored in the PW MAC address tables.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
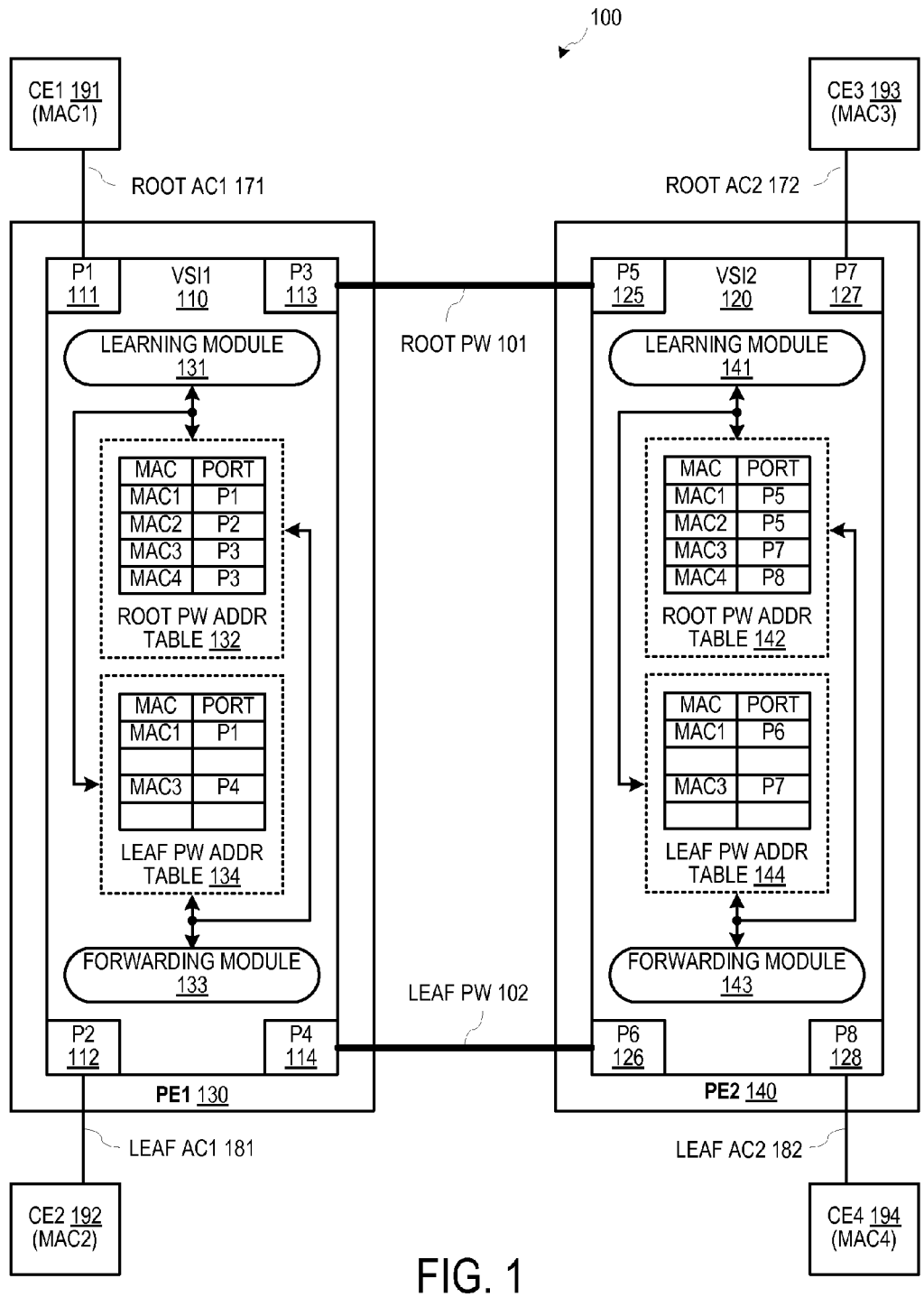
FIG. 1 illustrates an exemplary e-tree service network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements provide support for VPLS (Virtual Private LAN Service). For example, in a VPLS network, subscriber end stations access content/services provided through the VPLS network by coupling to CEs, which are coupled through network element PEs coupled by other network elements. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a network element PE via an attachment circuit also known as an access circuit (e.g., a virtual link or connection between the CE and the network element PE). The bridge module of the network element PE attaches to an emulated LAN through an emulated LAN interface. Each bridge module acts as a "Virtual Switch Instance" (VSI) by maintaining a forwarding table that maps MAC addresses to pseudowires and attachment circuits. Network element PEs forward frames (received from CEs) to destinations (e.g., other CEs, other network element PEs) based on the MAC destination address field included in those frames.

FIG. 1 illustrates a simple exemplary e-tree service instance implemented over an MPLS/PW network, referred to as an "e-tree service network," according to one embodiment of the present invention. In this simplified network 100, there are two network elements PE1 130 and PE2 140 acting as provider's edge network elements. Network element PE1 130 has a virtual switch interface VSI1 110 with four logical ports. Similarly, network element PE2 140 has a virtual switch interface VSI2 120 with four logical ports. While network elements PE1 130 and PE2 140 are shown to each have four logical ports, it should be understood that the virtual switch interface in these network elements may have any number of logical ports. Network element PE1 130 has one root access circuit (AC) RAC1 171 coupled to a customer edge network element CE1 191 with Media Access Control (MAC) address MAC1, and one leaf AC LAC1 181 coupled to another customer edge network element CE2 192 with MAC address MAC2. Thus, in this exemplary network, network element CE1 191 is a root node, and network element CE2 192 is a leaf node. Similarly, network element PE2 140 has one root access circuit RAC2 172 coupled to a customer edge network element CE3 193 with MAC address MAC3, and one leaf access circuit LAC2 182 coupled to another customer edge network element CE4 194 with MAC address MAC4. Thus, network element CE3 193 is a root node, and network element CE4 194 is a leaf node. Instead of a conventional single pseudowire (PW), network element PE1 130 is coupled to network element PE2 140 through a set of PWs including a root PW (RPW) 101 for carrying packets that are sent from a root node network element in the e-tree service network and a leaf PW (LPW) 102 for carrying packets that are sent from a leaf node network element in the e-tree service network. At each of network elements PE1 130 and PE2 140, each PW has its own discrete logical port assignment such that the two PWs do not share the same logical port. Thus, each of network elements PE1 130 and PE2 140 includes: (1) a logical port associated with a leaf AC that is coupled to a local leaf node; (2) a logical port associated with a root AC that is coupled to a local root node; (3) a logical port associated with a root PW; and (4) a logical port associated with a leaf PW. In other embodiments, each of network elements PE1 130 and PE2 140 may have other logical ports that are associated with other nodes coupled to other network elements and/or other sets of PWs coupled to other edge network elements. Furthermore, it is not necessary for network elements PE1 130 and PE2 140 to each have any logical port associated with a local AC. For example, in an alternative embodiment, network element PE2 140 may not have a locally connected leaf AC, and hence network element PE2 140 may have only three active logical ports in the e-tree service network 100.

In accordance to one embodiment of the present invention, a network element in the e-tree service network is configured to discard illegal packets without forwarding illegal packets to other network elements in the e-tree service network. While the present invention is described with reference to an e-tree service having only one type of provider's edge network elements, it should be understood that an individual edge network element in accordance with the present invention (e.g., network element PE1) can also be deployed in an e-tree service network with other types of edge network elements that may use other types e-tree service packet forwarding techniques. Furthermore, while the present invention is described with reference to network elements PE1 130 and PE2 140 as being provider's edge network elements, the components and methods as described herein can be applied to other types of network elements as well.

By way of example, the components of network element PE1 130 will now be described. Network element PE2 140 has analogous components. The network element PE1 130 includes a root PW MAC address table 132, a leaf PW MAC address table 134, a learning module 131, and a forwarding module 133. As described herein, each of the modules can be implemented in software, hardware, or a combination of both. The root PW MAC address table 132 is configured to store one set of associations between the logical ports of network element PE1 130 and MAC addresses of other network elements in the e-tree service network. The leaf PW MAC address table 134 is configured to store another set of associations between the logical ports of network element PE1 130 and MAC addresses of other network elements in the e-tree service network. Together, the root PW MAC address table 132 and leaf PW MAC address table 134 (collectively referred to as "PW MAC address tables") enable network element PE1 to determine if a packet should be forwarded from network element PE1 130 to another network element in the e-tree service network. Entries in the PW MAC address tables 132 and 134 associate a particular logical port in network element PE1 130 with the MAC address of another network device in the network that can be reached through that particular logical port.

The network element PE1 130 also includes a learning module 131 coupled to the root PW MAC address table 132 and the leaf PW MAC address table 134. The learning module 131 is configured to capture source MAC addresses of packets received at the network element PE1 130, and to associate the source MAC addresses with the logical ports of the network element PE1 130 in the root PW MAC address table 132 and the leaf PW MAC address table 134 based on a set of port association rules. At least one of the port association rules associates a particular logical port with a particular source MAC address without having to have received a packet with that particular source MAC address on that particular logical port. In others words, unlike conventional address learning techniques, a logical port may be associated with a MAC address even though the logical port has never received a packet having that MAC address as the source MAC address of the packet.

The set of association rules used in the learning module 131 will now be described. For each packet received on a logical port associated with a root PW that couples the network element PE1 130 with another network element in the e-tree service network, the learning module 131 associates that packet's source MAC address with the logical port that is associated with that root PW in the root PW MAC address table 132. In addition, the learning module 131 associates that packet's source MAC address with logical port associated with the leaf PW that couples the network element PE1 130 with that same other network element in the e-tree service network in the leaf PW MAC address table 134. In other words, the learning module 131 associates the source MAC address with the logical port that is associated with the leaf PW of the PW pair that the root PW is part of, in the leaf PW MAC address table 134.

For each packet received on the logical port associated with the leaf PW, the learning module 131 associates, in the root PW MAC address table 132, that packet's source MAC address with the logical port that is associated with the root PW of the PW pair that the leaf PW is part of For each packet received on a logical port associated with a leaf AC that couples the network element PE1 130 to a local leaf network element in the e-tree service network, the learning module 131 associates, in the root PW MAC address table 132, that packet's source MAC address with the logical port that is associated with that leaf AC. Note that in this embodiment, an entry is not created in the leaf PW MAC address table 134. In an alternative embodiment, rather than omitting the creation of an entry in the leaf PW MAC address table 134, the learning module 131 stores that packet's source MAC address in an entry in the leaf PW MAC address table 134. But instead of associating that MAC address with a logical port, the MAC address is associated with a "discard" indicator.

For each packet received on a logical port associated with a root AC that couples the network element PE1 130 with a local root network element in the e-tree service network, the learning module 131 associates that packet's source MAC address with the logical port that is associated with that root AC in the root PW MAC address table 132. In addition, the learning module 131 associates that packet's source MAC address with the logical port that is associated with that root AC in the leaf PW MAC address table 134.

The network element PE1 130 also includes a forwarding module 133 coupled to the root PW MAC address table 132 and the leaf PW MAC address table 134. The forwarding module 133 is configured to look up destination MAC addresses of the packets received at the network element PE1 130 in at least one of the PW MAC address tables 132 and 134, and to determine whether to forward or to discard each of the packets based on the two sets of associations respectively stored in the PW MAC address tables 132 and 134. For each packet that is received on a logical port associated with a root PW or on a logical port associated with a locally connected root AC, if that packet's destination MAC address is found in the root PW MAC address table 132, then the forwarding module 133 forwards the packet on the logical port as indicated in the root PW MAC address table 132. For each packet that is received on a logical port associated with a leaf PW or on a logical port associated with a locally connected leaf AC, the forwarding module 133 discards that packet if that packet's destination MAC address is found in the root PW MAC address table 132 but not in the leaf PW MAC address table 134. If that packet's destination MAC address is found in the leaf PW MAC address table 134, then the forwarding module 133 forwards the packet on the logical port as indicated in the leaf PW MAC address table 134. In an alternative embodiment, the forwarding module 133 discards that packet even though the packet's destination MAC address is found in the leaf PW MAC address table if the destination MAC address is associated with a "discard" indicator in the leaf PW MAC address table 134. Because the forwarding decision is performed locally within each of the edge network elements in the e-tree service network, packets from a local leaf node received in one edge network element destined for a remote leaf node attached to another edge network element are locally discarded. Hence, such packets are never transmitted across the PWs to minimize unnecessary network traffic between edge network elements to yield a more efficient e-tree service network.

The forwarding module 133 is also configured to determine which of the logical ports to broadcast a packet on if that packet's destination MAC address is not in both the PW MAC address tables 132 and 134. This broadcasting of packets with unknown destination MAC addresses facilitates the MAC address learning process. When the network element PE1 130 receives a packet on a logical port associated with a leaf AC, if that packet's destination MAC address is not found in the root PW MAC address table 132 and not found in the leaf PW MAC address table 134, then the forwarding module 133 broadcasts that packet on the logical ports that are associated with root ACs and leaf PWs. When the network element PE1 130 receives a packet on a logical port associated with a leaf PW, if that packet's destination MAC address is not found in the root PW MAC address table 132 and not found in the leaf PW MAC address table 134, then the forwarding module 133 broadcasts that packet on the logical ports that are associated with root ACs and other leaf PWs. When the network element PE1 130 receives a packet on a logical port associated with a root AC, if that packet's destination MAC address is not found in the root PW MAC address table 132 and not found in the leaf PW MAC address table 134, then the forwarding module 133 broadcasts that packet on the logical ports that are associated with leaf ACs, root PWs, and other root ACs. When the network element PE1 130 receives a packet on a logical port associated with a root PW, if that packet's destination MAC address is not found in the root PW MAC address table 132 and not found in the leaf PW MAC address table 134, then the forwarding module 133 broadcasts that packet on the logical ports that are associated with leaf ACs, root ACs, and other root PWs.

By way of example, network element PE1 130 is configured by a network administrator to have the following logical port assignments in the VSI 110 of network element PE1 130: (1) root access circuit RAC1 171 is assigned logical port P1 111; (2) leaf access circuit LAC1 181 is assigned to logical port P2 112; (3) root PW 101 is assigned logical port P3 113; and (4) leaf PW 102 is assigned logical port P4 114. Similarly, network element PE2 140 is configured to have the following logical port assignments in the VSI2 120 of network element PE2 140: (1) root access circuit RAC2 172 is assigned logical port P7 127; (2) leaf access circuit LAC2 182 is assigned to logical port P8 128; (3) root PW 101 is assigned logical port P5 125; and (4) leaf PW 102 is assigned logical port P6 126. Hence, each network element is individually aware of its own local logical port assignments and is aware of the type of node that is attached to each of the network element's own local logical ports.

Initially, although network element PE1 130 has knowledge of the types of node that are locally connected based on the logical port assignment described above, network element PE1 130 has no knowledge of the MAC addresses of any of the other network elements that are coupled to those logical ports. During an enhanced address learning process, the learning module 131 of network element PE1 130 captures the source MAC addresses of packets sent to network element PE1 130 from the other network elements in the network. In accordance with one embodiment of the present invention, when network element PE1 130 receives a packet with a source MAC address on one of its logical ports, the learning module 131 in network element PE1 stores the source MAC address of the packet and a logical port as determined by the set of port associated rules described above, in a new entry in at least one of the PW MAC address tables 132 and 134.

For example, when a packet originating from CE1 191 with source MAC address MAC1 is received on logical port P1 111 that is associated with root access circuit RAC1 171, responsive to receiving this packet, the learning module 131 in network element PE1 130 stores the MAC address MAC1 in an entry in the root PW MAC address table 132 and associates the source MAC address MAC1 with the logical port P1 111 that is associated with the root access circuit RAC1 171 in the root PW MAC address table 132. Furthermore, the learning module 131 in network element PE1 130 stores the MAC address MAC1 in an entry in the leaf PW MAC address table 134 and associates the source MAC address MAC1 with the logical port P1 111 that is associated with the root access circuit RAC1 171 in the leaf PW MAC address table 134. The learning module 131 stores entries in both PW MAC address tables 132 and 134 because this packet was received on a locally connected root AC.

When a packet originating from CE2 192 with source MAC address MAC2 is received on logical port P2 112 that is associated with leaf access circuit LAC1 181, responsive to receiving this packet, the learning module 131 in network element PE1 130 stores the MAC address MAC2 in an entry in the root PW MAC address table 132 and associates the source MAC address MAC2 with the logical port P2 112 that is associated with the leaf access circuit LAC1 181 in the root PW MAC address table 132. The learning module 131 does not store an entry in the leaf PW MAC address table 134 because this packet was received on a locally connected leaf AC. In an alternative embodiment, rather than omitting the creation of an entry in the leaf PW MAC address table 134, the learning module 131 stores the MAC address MAC2 in an entry in the leaf PW MAC address table 134. But instead of associating the MAC address MAC2 with a logical port, the MAC address MAC2 is associated with a "discard" indicator.

When a packet originating from CE3 193 with source MAC address MAC3 is received on logical port P3 113 that is associated with root PW 101, responsive to receiving this packet, the learning module 131 in network element PE1 130 stores the MAC address MAC3 in an entry in the root PW MAC address table 132 and associates the source MAC address MAC3 with the logical port P3 113 that is associated with the root PW 102 in the root PW MAC address table 132. Furthermore, the learning module 131 in network element PE1 130 stores the MAC address MAC3 in an entry in the leaf PW MAC address table 134 and associates the source MAC address MAC3 with the logical port P4 114 that is associated with the leaf PW 102 in the leaf PW MAC address table 134. The learning module 131 stores entries in both PW MAC address tables 132 and 134 because this packet was received on a root PW. Note that this aspect of the address learning mechanism is different from conventional address learning methods in that the logical port that is associated with the MAC address MAC3 in the leaf PW MAC address table 134 is not the logical port that received this packet. Rather, the MAC address MAC3 in the leaf PW MAC address table 134 is associated with a different logical port than the logical port that received this packet. More specifically, the MAC address MAC3 is associated with the logical port assigned to the leaf PW 102 instead of the logical port assigned to the root PW 101 that received this packet.

When a packet originating from CE4 194 with source MAC address MAC4 is received on logical port P4 114 that is associated with leaf PW 102, responsive to receiving this packet, the learning module 131 in network element PE1 130 stores the MAC address MAC4 in an entry in the root PW MAC address table 132 and associates the source MAC address MAC4 with the logical port P3 113 that is associated with the root PW 101 in the root PW MAC address table 132. The learning module 131 does not store an entry in the leaf PW MAC address table 134 because this packet was received on a leaf PW. In an alternative embodiment, rather than omitting the creation of an entry in the leaf PW MAC address table 134, the learning module 131 stores the MAC address MAC4 in an entry in the leaf PW MAC address table 134. But instead of associating the MAC address MAC4 with a logical port, the MAC address MAC4 is associated with a "discard" indicator. Note that this aspect of the address learning mechanism is different from conventional address learning methods in that the logical port that is associated with the MAC address MAC4 in the root PW MAC address table 132 is not the logical port that received this packet. Rather, the MAC address MAC4 in the root PW MAC address table 132 is associated with a different logical port than the logical port that received this packet. More specifically, the MAC address MAC4 is associated with the logical port assigned to the root PW 101 instead of the logical port assigned to the leaf PW 102 that received this packet.

It should be noted that initially, before network element PE2 140 has learned the MAC addresses of the network elements locally coupled to network element PE1 130, the packets that are received by network element PE1 130 on either the root PW 101 or the leaf PW 102 are packets that are broadcasted from network element PE2 140. For example, a packet originating from network element CE3 193 or a local root node with an unknown destination MAC address will be broadcasted on the root PW 101 to network element PE1 130 by network element PE2 140. Network element PE2 140 will broadcast the packet on root PW 101 instead of leaf PW 102 because network element PE2 140 is aware that this packet originated from a local root AC, and packets originating from a root node should be sent on the root PW 101. Similarly, a packet with an unknown destination MAC address originating from CE4 194 or a local leaf node will be broadcasted by network element PE2 140 on the leaf PW 102 instead of root PW 101. The broadcast mechanism to facilitate the MAC address learning process as described herein is different from conventional broadcast methods in that a packet with an unknown destination MAC address is not broadcasted on all logical ports. Instead, the packet is selectively broadcasted on either the root PW 101 or the leaf PW 102 and other appropriate locally connected ACs.

By way of example, the broadcast mechanism in accordance with one embodiment of the present invention will now be described with reference to network element PE1 130. When network element PE1 130 receives a packet with a destination MAC address that is not both PW MAC address tables 132 and 134, that packet is broadcasted out on the appropriate logical ports according to the e-tree service network requirements. For example, when network element PE1 130 receives a packet on logical port P2 112 associated with leaf access circuit LAC1 181 that is coupled to local leaf node network element CE2 192, responsive to determining that the destination MAC address is not in both PW MAC address tables 132 and 134, the forwarding module 133 of network element PE1 130 broadcasts that packet out logical port P4 114 onto the leaf PW 102 towards network element PE2 140 and out logical port P1 111 onto the root access circuit RAC1 171 towards the local root node network element CE1 191. In another embodiment where network element PE1 130 has other logical ports associated with local root ACs, this packet is also broadcasted on those other logical ports that are associated with other local root ACs. This packet is not broadcasted on the root PW 101 because this packet originated from a local leaf node. Furthermore, this packet is not broadcasted on any logical ports that are associated with a local leaf AC because a packet from a leaf node should not be forwarded to another leaf node according to the e-tree service network requirements.

When network element PE1 130 receives a packet on logical port P1 111 associated with leaf access circuit RAC1 171 that is coupled to local root network element CE1 191, responsive to determining that the destination MAC address is not in both PW MAC address tables 132 and 134, the forwarding module 133 of network element PE1 130 broadcasts that packet out logical port P3 113 onto the root PW 101 towards network element PE2 140 and out logical port P2 112 onto the leaf access circuit LAC1 181 towards the local leaf node network element CE2 192. In another embodiment where network element PE1 130 has other logical ports associated with other local leaf and root ACs, this packet is also broadcasted on those other logical ports that are associated with other local leaf and root ACs. This packet is not broadcasted on the leaf PW 102 because this packet originated from a local root node.

When network element PE1 130 receives a packet on logical port P3 113 associated with root PW 101, responsive to determining that the destination MAC address is not in both PW MAC address tables 132 and 134, the forwarding module 133 of network element PE1 130 broadcasts that packet out logical port P1 111 onto the root access circuit RAC1 171 towards local root node network element CE1 191 and out logical port P2 112 onto the leaf access circuit LAC1 181 towards the local leaf node network element CE2 192. In another embodiment where network element PE1 130 has other logical ports associated with other local leaf and root ACs, this packet is also broadcasted on those other logical ports that are associated with other local leaf and root ACs. This packet is not broadcasted on the leaf PW 102 towards network element PE2 140 because this packet originated from network element PE2 140 and because this packet originated from a remote root node. In an alternative embodiment where network element PE1 130 has additional root PWs connected to other network elements in the e-tree service network, this packet would also be broadcasted onto those other root PWs.

When network element PE1 130 receives a packet on logical port P4 114 associated with leaf PW 102, responsive to determining that the destination MAC address is not in both PW MAC address tables 132 and 134, the forwarding module 133 of network element PE1 130 broadcasts that packet out logical port P1 111 onto the root access circuit RAC1 171 towards local root node network element CE1 191. In another embodiment where network element PE1 130 has other logical ports associated with other local root ACs, this packet is also broadcasted on those other logical ports that are associated with other local root ACs. This packet is not broadcasted on the root PW 101 towards network element PE2 140 because this packet originated from network element PE2 140 and because this packet originated from a remote leaf node. Furthermore, this packet is not broadcasted on any logical ports that are associated with a local leaf AC because a packet from a leaf node should not be forwarded to another leaf node according to the e-tree service network requirements. In an alternative embodiment where network element PE1 130 has additional leaf PWs connected to other network elements in the e-tree service network, this packet would also be broadcasted onto those other leaf PWs.

Using the address learning process and the broadcasting mechanism to facilitate the address learning process as described above, the learning module 131 would populate the PW MAC address tables 132 and 134 in network element PE1 130 as shown in FIG. 1 for the exemplary e-tree service network 100. Similarly, the learning module 141 in network element PE2 140 would populate its PW MAC address tables 142 and 144 as shown using a similar address learning process. A packet forwarding mechanism using the MAC address tables according to one embodiment of the present invention will now be described.

By way of example, when network element PE1 130 receives a packet on logical port P2 112 associated with leaf access circuit LAC1 181 that is coupled to local leaf node network element CE2 192, responsive to determining that the destination MAC address is not in the leaf PW MAC address table 134, but is in the root PW MAC address table 132, the forwarding module 133 drops and discards this packet. In an alternative embodiment, if the destination MAC address is in the leaf PW MAC address table 134, but is associated with a "discard" indicator, the forwarding module 133 drops and discards this packet. If the destination MAC address is in the leaf PW MAC address table 134 (and is not associated with a "discard" indicator), then responsive to determining that the destination MAC address is in the leaf PW MAC address table 134, the forwarding module 133 forwards the packet onto the logical port as indicated in the leaf PW MAC address table 134. The same packet forwarding mechanism applies to a packet received on logical port P4 114 associated with leaf PW 102.

When network element PE1 130 receives a packet on logical port P1 111 that is associated with root access circuit RAC1 171, responsive to determining that the destination MAC address of this packet is in the root MAC address table 132 stored in the network element PE1 130, the forwarding module 133 forwards this packet out onto that logical port as indicated by the root MAC address table 132. The same packet forwarding mechanism applies to a packet received on logical port P3 113 associated with root PW 101.

While the forwarding mechanism has been described above with respect to network element PE1 130, the same forwarding mechanism applies to network element PE2 140. It should also be noted that while the exemplary e-tree service network shown in FIG. 1 has only two provider's edge network element PE1 130 and PE2 140, and each provider's edge network element has only one locally connected root AC and one locally connected leaf AC, the enhanced address learning and forwarding mechanisms described herein apply to any arbitrary e-tree service network with any number of provider's edge network elements and any number of root ACs or leaf ACs attached to each provider's edge network element. Furthermore, each root AC or leaf AC attached to a provider's edge network element may be part of the same e-tree service network, or be part of a different e-tree service network. In another embodiment, if an edge network element has only locally connected root ACs, then it is only necessary for that edge network element to establish a single PW to other edge network elements in the network.

The operations of the flow diagrams in FIGS. 2 and 3A-3B will now be described. However, it should be understood that the operations of the flow diagrams in FIGS. 2 and 3A-3B can be performed by embodiments of the invention other than those discussed with reference to FIG. 1, and the embodiments discussed with reference to FIG. 1 can perform operations different than those discussed with reference to the flow diagrams of FIGS. 2 and 3A-3B.

Figure 2:
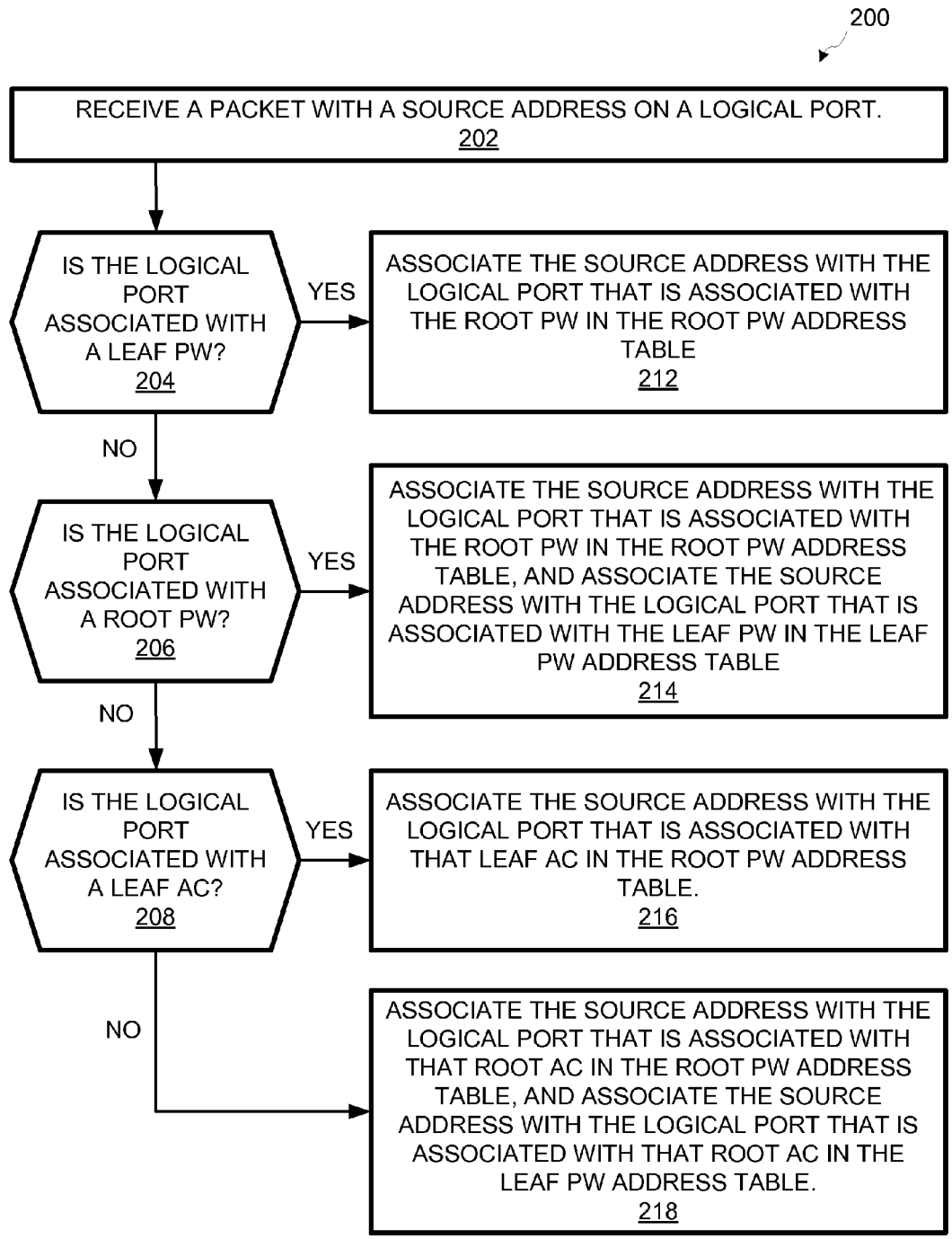
FIG. 2 illustrates a method for enhanced address learning in an e-tree service network according to one embodiment of the invention.

FIG. 2 illustrates a flow diagram for a method of enhanced address learning 200 in a network element in an e-tree service network in accordance to one embodiment of the present invention. In one embodiment, the method of enhanced address learning 200 is performed by a learning module in the network element. It should be understood that the learning module can be implemented with software, hardware, or a combination of both.

In block 202, the network element receives a packet with an unknown source MAC address on a logical port. In block 204, the network element determines if that logical port is associated with a leaf PW (i.e., the logical port has been assigned to a leaf PW). If it is determined that the logical port is associated with a leaf PW, then in block 212, the network element associates the source MAC address with the logical port that is associated with the root PW in the root PW MAC address table. In an alternative embodiment, the network element also associates the source MAC address with a "discard" indicator in the leaf PW address table. If the logical port that received the packet is not associated with a leaf PW, then in block 206, it is determined if the logical port is associated with a root PW. If it is determined that the logical port is associated with a root PW, then in block 214, the network element associates the source MAC address with the logical port that is associated with the root PW in the root PW MAC address table, and also associates the source MAC address with the logical port that is associated with the leaf PW in the leaf PW MAC address table.

If the logical port that received the packet is not associated with a root PW, then in block 208, it is determined if the logical port is associated with a locally connected leaf AC. If it is determined that the logical port is associated with a leaf AC, then in block 216, the network element associates the source MAC address with the logical port that is associated with the leaf AC in the root PW MAC address table. In an alternative embodiment, the network element also associates the source MAC address with a "discard" indicator in the leaf PW address table. If the logical port that received the packet is not associated with a leaf AC, then the logical port is associated with a root AC. In block 218, the network element associates the source MAC address with the logical port that is associated with the root AC in the root PW MAC address table, and also associates the source MAC address with the logical port that is associated with the leaf AC in the leaf PW MAC address table.

Figure 3:
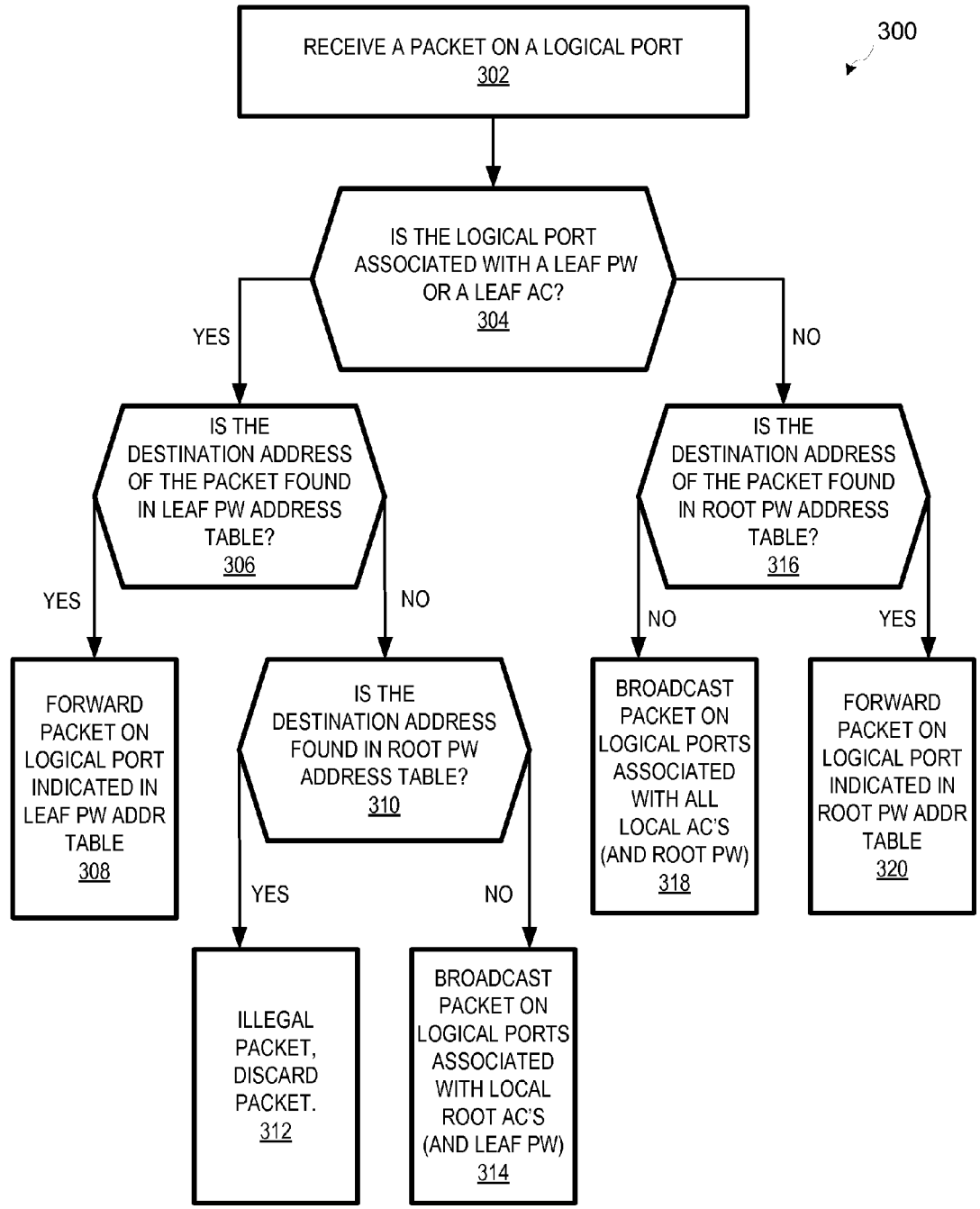
FIG. 3 illustrates a method for packet forwarding in an e-tree service network according to one embodiment of the invention.

FIG. 3 illustrates a flow diagram for a method of packet forwarding 300 in a network element in an e-tree service network in accordance to one embodiment of the present invention. The method of packet forwarding 300 is used to determine which PW (if any) and/or which locally connected AC (if any) that the network element should forward or broadcast a packet onto when the network element receives a packet on one of its logical ports. In one embodiment, the method of packet forwarding 300 is performed by a forwarding module in the network element. It should be understood that the forwarding module can be implemented with software, hardware, or a combination of both.

In block 302, the network element receives a packet with a destination MAC address on one of its logical ports. In block 304, the network element determines if the logical port that received the packet is associated with a leaf node (i.e. the logical port is assigned to either a leaf PW or a leaf AC). If the logical port is associated with a leaf node, then in block 306, the network element determines if the destination MAC address of the packet is found in the leaf PW MAC address table. If it is determined that the destination MAC address of the packet is in the leaf PW MAC address table, then in block 308, the network element forwards the packet on the logical port that is associated with the destination MAC address as indicated in the leaf PW MAC address table. If it is determined that the destination MAC address is not in the leaf PW MAC address table, then in block 310, the network element determines if the destination MAC address is found in the root PW MAC address table. If it is determined that the destination MAC address of the packet is not in the leaf PW MAC address table and also not in the root PW MAC address table, then in block 314, the network element broadcasts the packet on other logical ports that are associated with a leaf PW and on other logical ports that are associated with a local root access circuit (i.e. logical ports that are assigned to either a leaf PW or a root AC). If it is determined that the destination MAC address of the packet is not in the leaf PW MAC address table but is found in the root PW MAC address table, then the packet is an illegal packet, and in block 312, the network element drops and discards the packet.

In an alternative embodiment where the leaf PW MAC address table includes MAC addresses that are associated with a "discard" indicator, the packet forwarding mechanism for packets that are received on a leaf node is modified as follows. The network element determines if the destination MAC address is found in the leaf PW MAC address table. If the destination MAC address is found in the leaf PW MAC address table, then it is determined if the destination MAC address is associated with a "discard" indicator. If so, the packet is an illegal packet, and the network element drops and discards the packet. If the destination MAC address is not associated with a "discard" indicator, then the network element forwards the packet on the logical port that is associated with the destination MAC address as indicated in the leaf PW MAC address table. If the destination MAC address is not found in the leaf PW MAC address table, then the network element broadcasts the packet on the logical ports that are associated with a leaf PW and on the logical ports that are associated with local root access circuits (i.e. logical ports that are assigned to either a leaf PW or a root AC). Note that by including a "discard" indicator in the leaf PW MAC address table, the packet forwarding mechanism can omit the step of determining if the destination MAC address is found in the root PW MAC address table (block 310) for packets that are received on a leaf node. Hence, the use of the "discard" indicator can improve the speed and performance of the forwarding mechanism.

Referring back to block 304, if the logical port that received the packet is not associated with a leaf node, then the logical port is associated with a root node (i.e. the logical port is assigned to either a root PW or a root AC). In block 316, the network element determines if the destination MAC address of the packet is found in the root PW MAC address table. If it is determined that the destination MAC address is not in the root PW MAC address table, then in block 318, the network element broadcasts the packet on other logical ports that are associated with a root PW and on other logical ports that are associated with a local access circuit (i.e. logical ports that are assigned to either a root PW, a root AC, or a leaf AC). If it is determined that the destination MAC address is in the root PW MAC address table, then in block 320, the network element forwards the packet on the logical port that is associated with the destination MAC address as indicated in the root PW MAC address table.

Figure 4A:
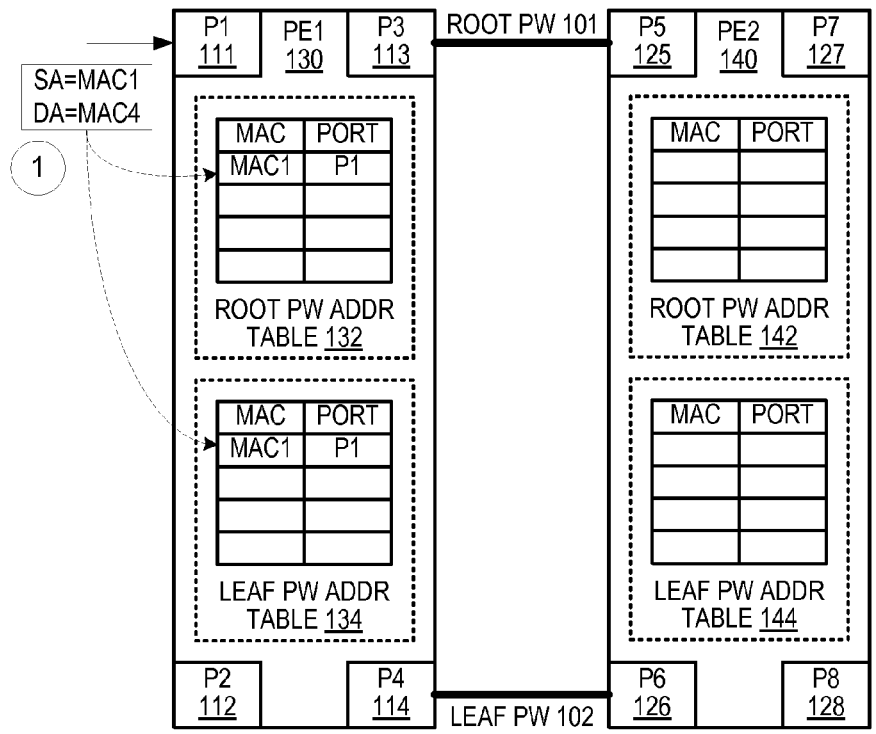
FIG. 4A illustrates the address learning and packet forwarding processes in network elements of an e-tree service network at a first point in time according to one embodiment of the invention.

By way of example, to further illustrate the operations of the flow diagrams of FIGS. 2 and 3, FIGS. 4A-4M show a series of packets received by the network elements PE1 130 and PE2 140 in the exemplary e-tree service network 100 as shown in FIG. 1. The circles enclosing a number in the figures represent the chronological order of events. However, it should be understood that events within the same figure may occur concurrently or in a different order than what is indicated by the numbers enclosed in the circles. As shown in FIG. 4A, initially, the PW MAC address tables 132 and 134 of network element PE1 130 and PW MAC address tables 142 and 144 of network element PE2 140 do not have all of the MAC addresses of the network elements in the network. At event 1, network element PE1 130 receives a packet with a source MAC address of MAC1 and a destination address MAC4 on logical port P1 111. Network element PE1 130 associates MAC address MAC1 with logical port P1 111 in the root PW MAC address table 132 and in the leaf PW MAC address table 134 in accordance to block 218 because logical port P1 111 is assigned to local root AC RAC1 171.

Figure 4B:
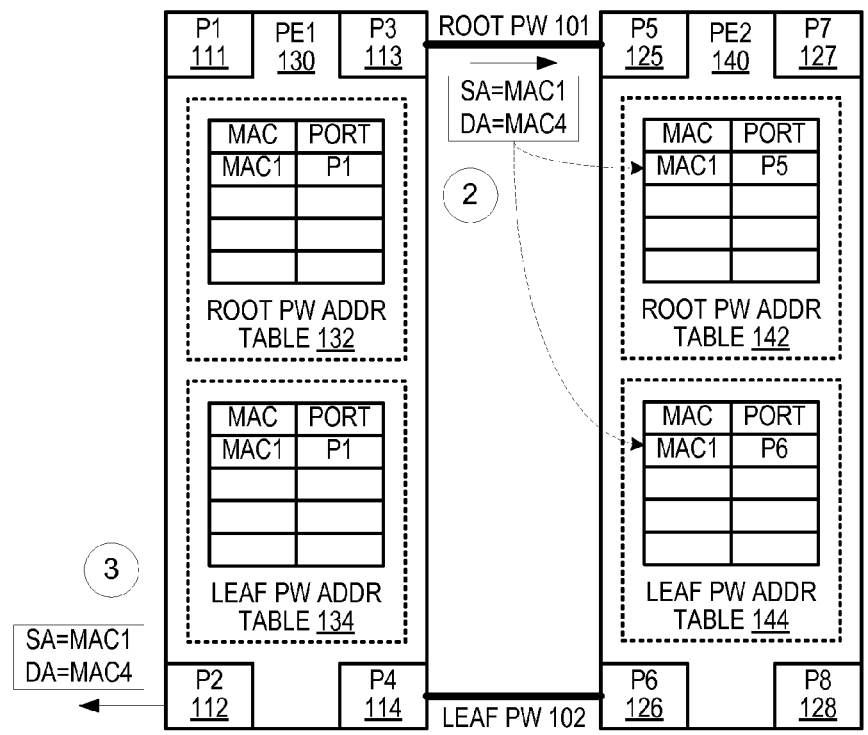
FIG. 4B illustrates the address learning and packet forwarding processes in network elements of an e-tree service network at a second point in time according to one embodiment of the invention.

At events 2 and 3 in FIG. 4B, network element PE1 130 broadcasts this packet on the logical port P3 113 assigned to the root PW 101 and on logical port P2 112 assigned to the other local leaf AC LAC1 181 because the destination MAC address MAC4 is not found in the root PW MAC address table 132 in accordance to block 318. Upon receiving this packet on logical port P5 125, network element PE2 140 associates MAC address MAC1 with logical port P5 125 in the root PW MAC address table 142, and also associates MAC address MAC1 with logical port P6 126 assigned to the leaf PW 102 in the leaf PW MAC address table 144 in accordance to block 214.

Figure 4C:
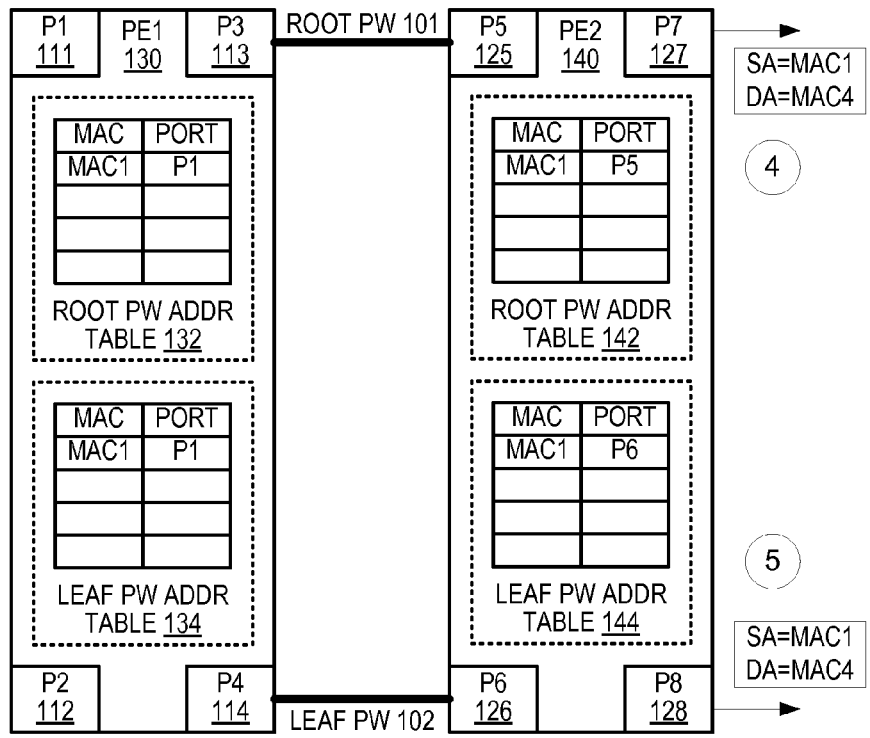
FIG. 4C illustrates the address learning and packet forwarding processes in network elements of an e-tree service network at a third point in time according to one embodiment of the invention.
Figure 4D:
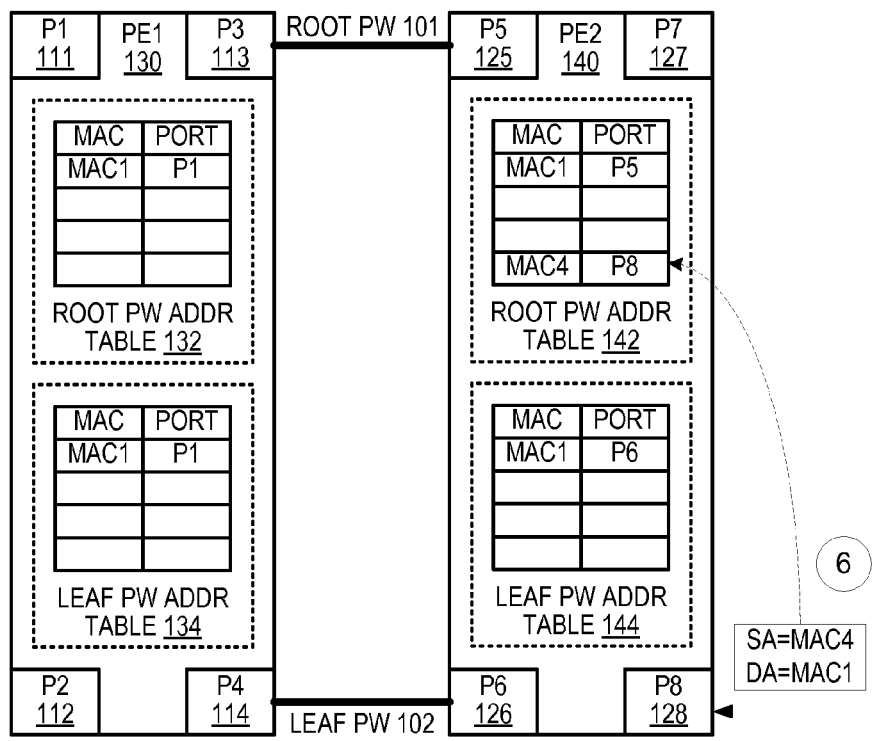
FIG. 4D illustrates the address learning and packet forwarding processes in network elements of an e-tree service network at a fourth point in time according to one embodiment of the invention.

At events 4 and 5 in FIG. 4C, network element PE2 140 broadcasts this packet on the logical port P7 127 assigned to local root AC RAC2 172 and logical port P8 128 assigned to local leaf AC LAC2 182 because the destination MAC address MAC4 is not found in the root MAC address table 142 in accordance to block 318. When network element CE4 194 having MAC address MAC4 (the intended recipient of this packet) receives this packet from network element PE2 140, network element CE4 194 will send a reply packet with a source MAC address MAC4 and a destination MAC address MAC1 towards logical port P8 128 of network element PE2 140 as indicated by event 6 in FIG. 4D. When network element PE2 140 receives this packet, network element PE2 140 associates the source MAC address MAC4 with logical port P8 128 in the root PW MAC address table 142 in accordance to block 216 because logical port P8 128 is assigned to local leaf AC LAC2 182.

Figure 4E:
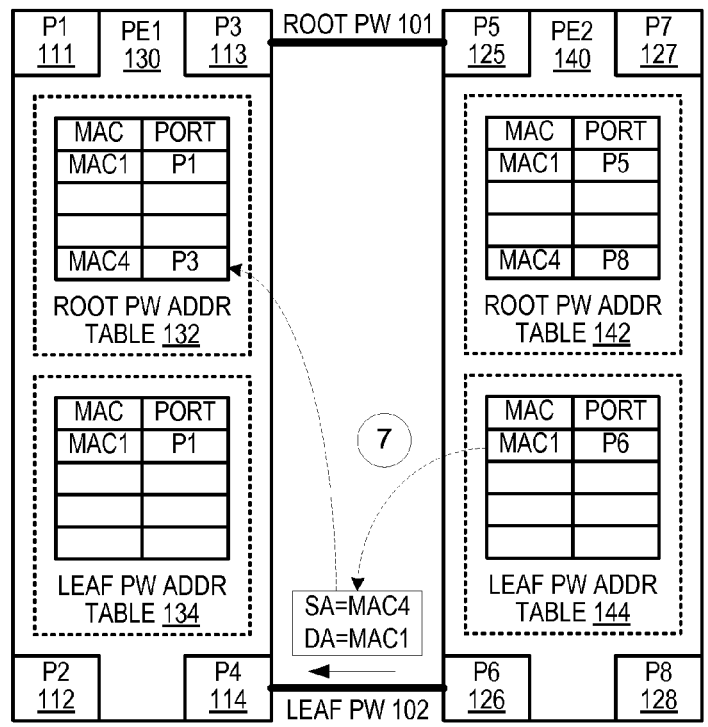
FIG. 4E illustrates the address learning and packet forwarding processes in network elements of an e-tree service network at a fifth point in time according to one embodiment of the invention.

At event 7 in FIG. 4E, network element PE2 140 determines that the logical port P8 128 that received this packet is associated with leaf AC LAC2 182, and that the destination MAC address MAC1 of the packet is found in its leaf PW MAC address table 144. Then, in accordance to block 308, network element PE2 140 forwards this packet on logical port P6 126 assigned to the leaf PW 102 as indicated in the leaf PW MAC address table 144. When network element PE1 130 receives this packet with source MAC address MAC4, network element PE1 130 associates MAC address MAC4 with logical port P4 114 in the root PW MAC address table 132 in accordance to block 212.

Figure 4F:
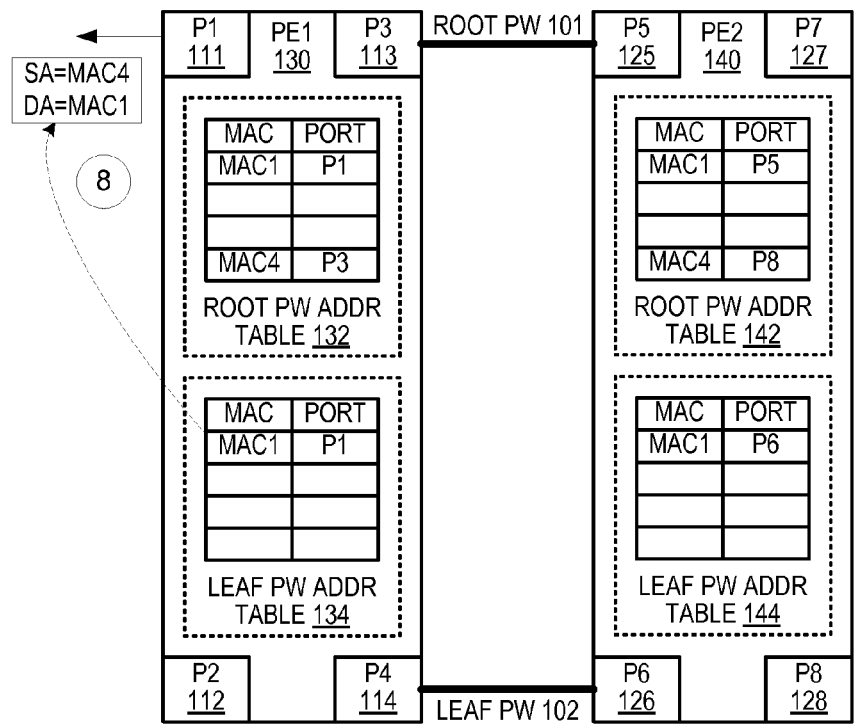
FIG. 4F illustrates the address learning and packet forwarding processes in network elements of an e-tree service network at a sixth point in time according to one embodiment of the invention.

At event 8 in FIG. 4F, network element PE1 130 determines that the logical port P4 114 that received this packet is associated with leaf PW 102, and that the destination MAC address MAC1 of the packet is found in the leaf PW MAC address table 134. Then, in accordance to block 308, network element PE1 130 forwards this packet on logical port P1 111 assigned to the root AC1 RAC1 171 as indicated in the leaf PW MAC address table 134.

Figure 4G:
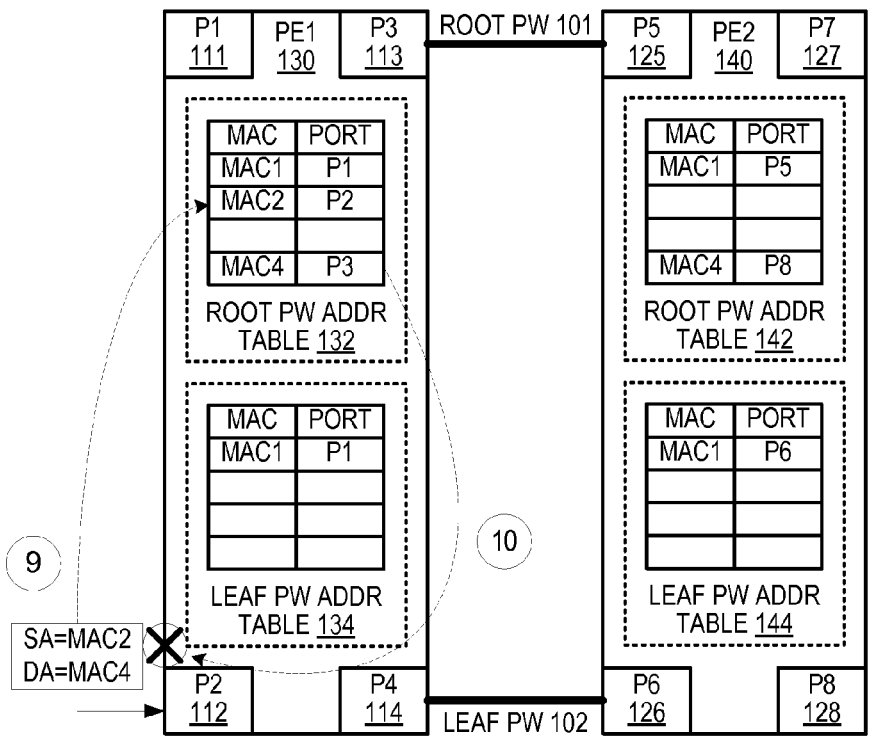
FIG. 4G illustrates the address learning and packet forwarding processes in network elements of an e-tree service network at a seventh point in time according to one embodiment of the invention.

At event 9 in FIG. 4G, network element PE1 130 receives a packet with source MAC address MAC2 and destination MAC address MAC4 on logical port P2 112. Network element PE1 130 associates MAC address MAC2 with logical port P2 112 in the root PW MAC address table 132 in accordance to block 216, because logical port P2 112 is assigned to local leaf AC LAC1 181. At event 10, network element PE1 130 determines that the logical port P2 112 that received this packet is associated with local leaf AC LAC1 181, that the destination MAC address MAC4 of the packet is not found in its leaf PW MAC address table 134, but is found in the root PW MAC address table 132. Then, in accordance to block 312, network element PE1 130 drops and discards this packet because this is an illegal packet sent from a leaf node intended for a leaf node.

Figure 4H:
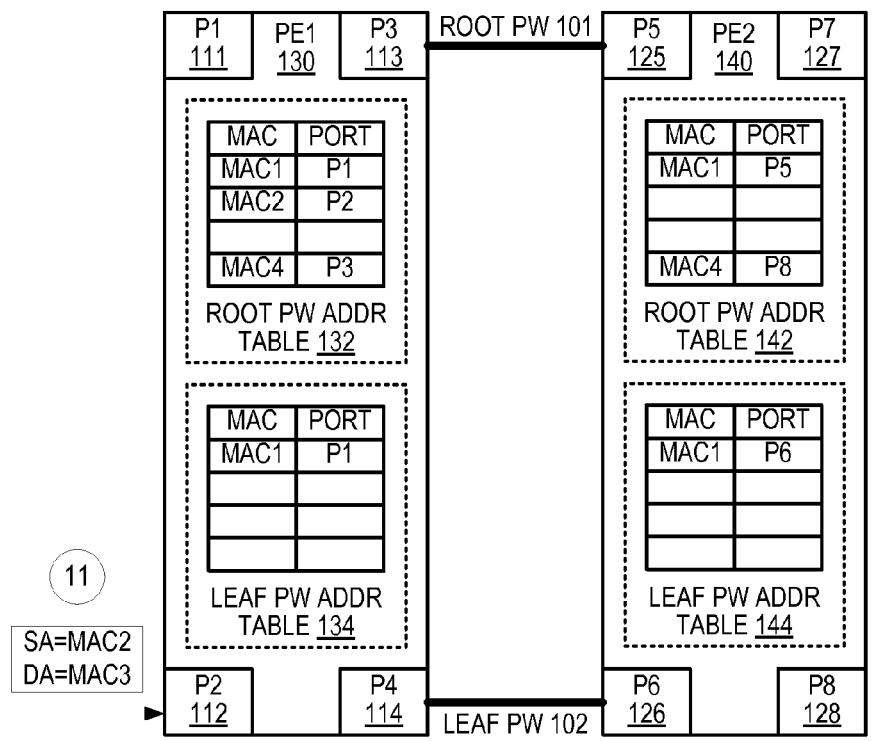
FIG. 4H illustrates the address learning and packet forwarding processes in network elements of an e-tree service network at an eighth point in time according to one embodiment of the invention.
Figure 4J:
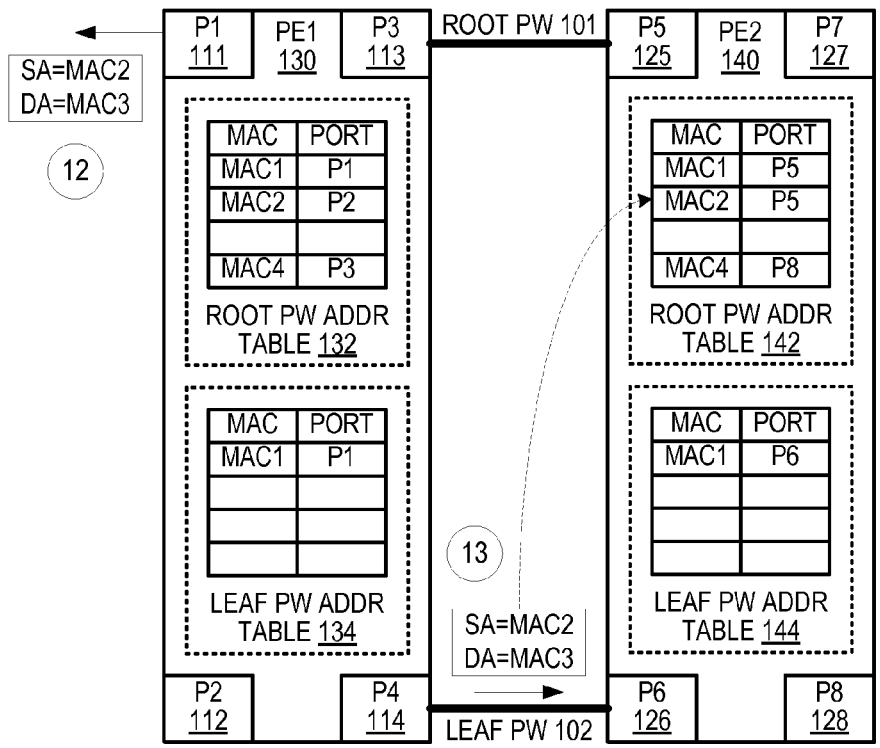
FIG. 4J illustrates the address learning and packet forwarding processes in network elements of an e-tree service network at a ninth further point in time according to one embodiment of the invention.

At event 11 in FIG. 4H, network element PE1 130 receives a packet with source MAC address MAC2 and destination MAC address MAC3 on logical port P2 112. At events 12 and 13 in FIG. 4J, network element PE1 130 determines that the logical port P2 112 that received this packet is associated with local leaf AC LAC1 181 and that the destination MAC address MAC3 of the packet is not found in the leaf PW MAC address table 134 and also not found in the root PW MAC address table 132. Then, in accordance to block 314, network element PE1 130 broadcasts this packet on the logical port P1 111 assigned to root AC RAC1 171 and on logical port P4 114 assigned to leaf PW 102. Upon receiving this packet on logical port P6 126, network element PE2 140 associates the source MAC address MAC2 with logical port P5 125 in the root PW MAC address table 142 in accordance to block 212.

Figure 4K:
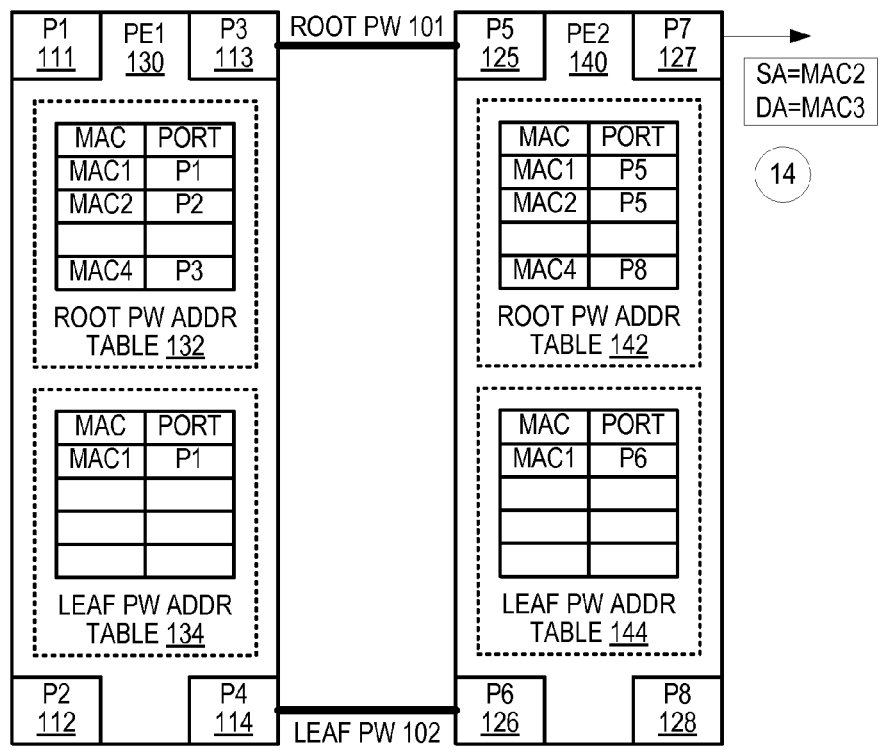
FIG. 4K illustrates the address learning and packet forwarding processes in network elements of an e-tree service network at a tenth point in time according to one embodiment of the invention.
Figure 4L:
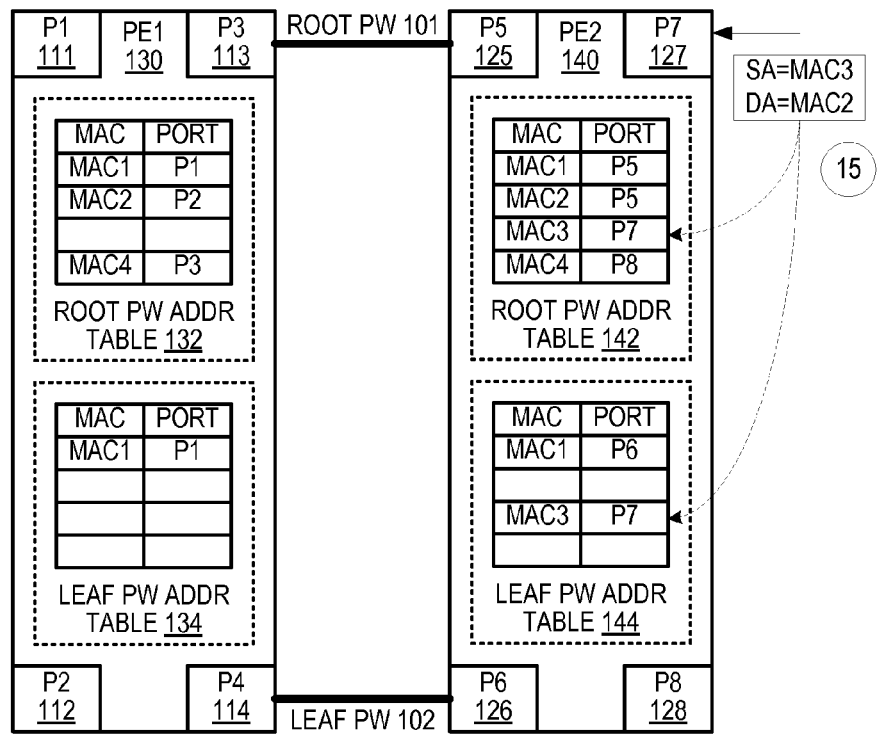
FIG. 4L illustrates the address learning and packet forwarding processes in network elements of an e-tree service network at an eleventh point in time according to one embodiment of the invention.

At event 14 in FIG. 4K, network element PE2 140 determines that the logical port P6 126 that received this packet is associated with leaf PW 102 and that the destination MAC address MAC3 of the packet is not found in its leaf PW MAC address table 144. Then, in accordance to block 314, network element PE2 140 broadcasts this packet on the logical port P7 127 assigned to root AC RAC2 172. When network element CE3 193 having MAC address MAC3 (the intended recipient of this packet) receives this packet from network element PE2 140, network element CE3 193 will send a reply packet with a source MAC address MAC3 and a destination MAC address MAC2 towards logical port P7 127 of network element PE2 140 as indicated by event 15 in FIG. 4L. When network element PE2 140 receives this packet, network element PE2 140 associates the source MAC address MAC3 with logical port P7 127 in the root PW MAC address table 142 and also in the leaf PW MAC address table 144 in accordance to block 218 because logical port P7 127 is assigned to local root AC RAC2 172.

Figure 4M:
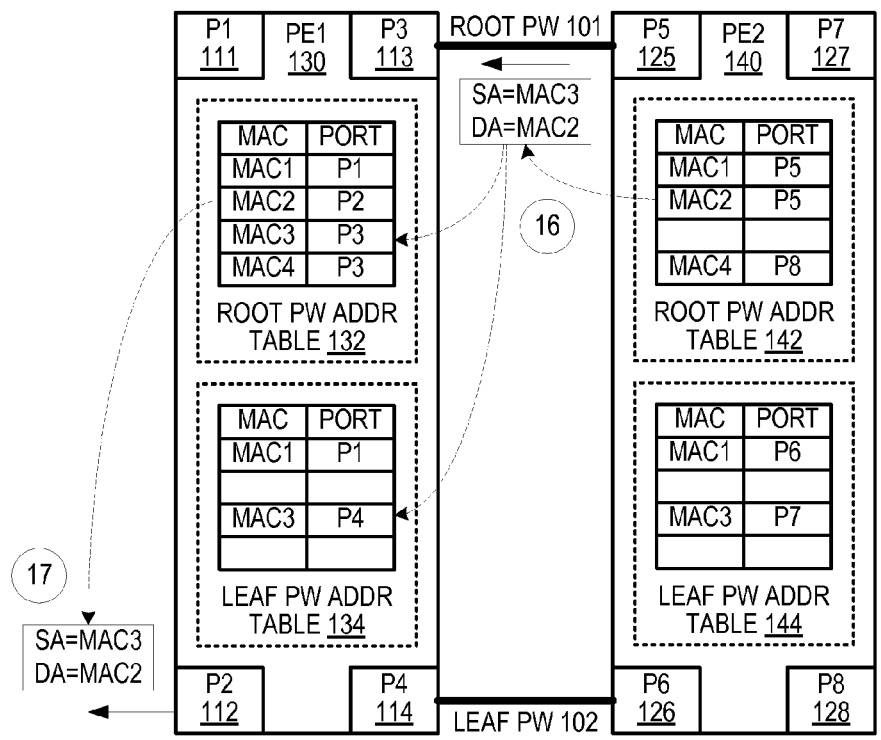
FIG. 4M illustrates the address learning and packet forwarding processes in network elements of an e-tree service network at a twelfth point in time according to one embodiment of the invention.

At event 16 in FIG. 4M, network element PE2 140 determines that the logical port P7 127 that received this packet is associated with root AC RAC2 172, and that the destination MAC address MAC2 of the packet is found in its root PW MAC address table 142. Then, in accordance to block 320, network element PE2 140 forwards this packet on logical port P5 125 assigned to the root PW 101 as indicated in the root PW MAC address table 142. When network element PE1 130 receives this packet with source MAC address MAC3, network element PE1 130 associates MAC address MAC3 with logical port P3 113 in the root PW MAC address table 132, and associates MAC address MAC3 with logical port P4 114 in the leaf PW MAC address table in accordance to block 214. At event 17, network element PE1 130 determines that the logical port P3 113 that received this packet is associated with root PW 101 and that the destination MAC address MAC2 of the packet is found in its root PW MAC address table 132. Then, in accordance to block 320, network element PE1 130 forwards this packet on the logical port P2 112 assigned to leaf AC LAC1 181 as indicated in root PW MAC address table 132.

Figure 5:
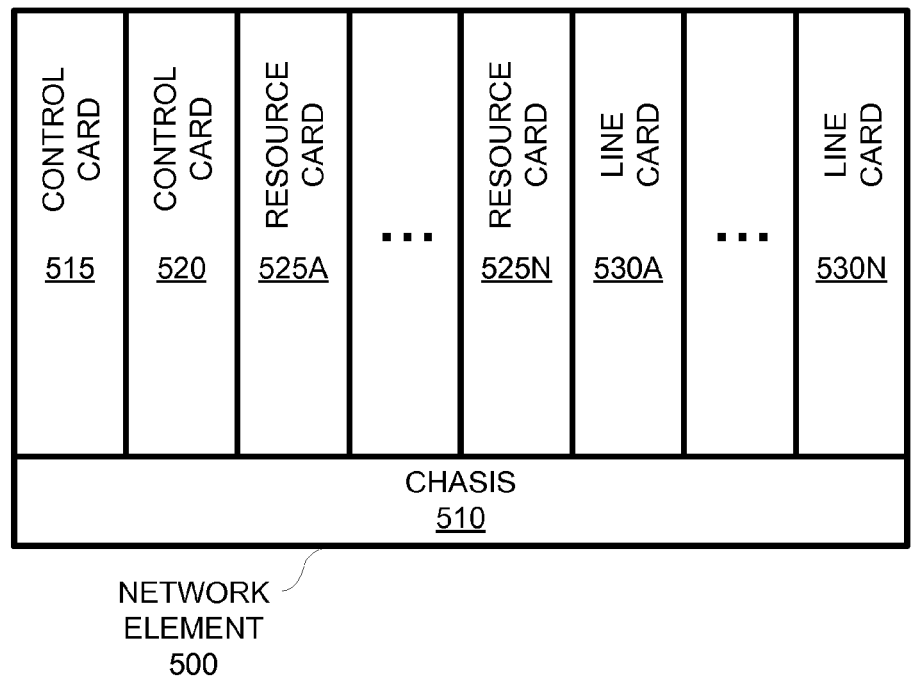
FIG. 5 illustrates a network element according to one embodiment of the invention.

FIG. 5 illustrates an exemplary network element used in some embodiments of the invention. As illustrated in FIG. 5, the network element 500 includes the control cards 515 and 520 (e.g., one control card is active the other is a backup), the resource cards 525A-525N, and the line cards 530A-530N. These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms. It should be understood that the architecture of the network element 500 illustrated in FIG. 5 is exemplary, and different combinations of cards may be used in other embodiments of the invention. For example, some network elements may include a set of one or more control cards, a set of zero or more resource cards, and a set of one or more line cards. In one embodiment, any of the network elements may have an architecture similar to that as illustrated in FIG. 5.

Figure 6:
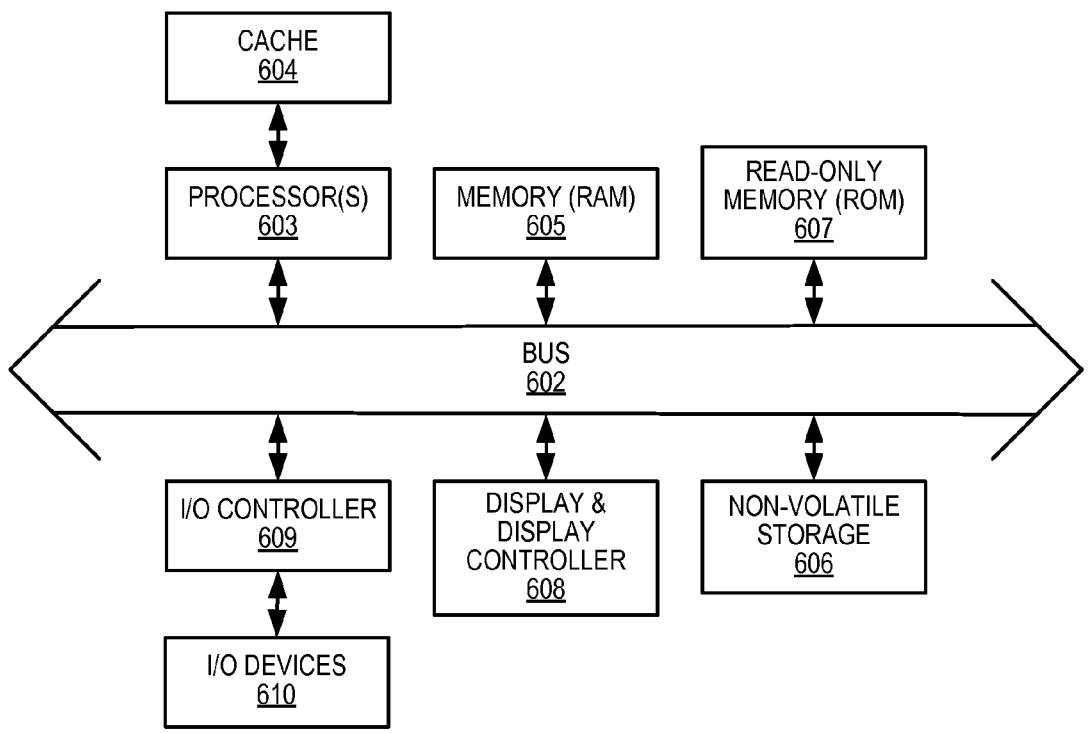
FIG. 6 illustrates a line/control card in a network element according to one embodiment of the invention.

Each of the cards illustrated in FIG. 5 include one or more processors and one or more memories as shown in FIG. 6. For example, the line cards 530A-530B typically include one or more packet processing units to process packets including forwarding and/or switching packets at high speed, and include one or more memories to store a one or more MAC address tables described herein. The control cards 515 and 520 also include one or more processors 603 to perform signaling, routing (including creation of and/or management of MAC address tables), connection setup, session setup, etc. For example, among other things, the control card 515 execute instructions stored in memory (e.g., cache 604, RAM 605, ROM 607, or non-volatile storage 606) to execute the learning and forwarding modules described herein. As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors 603 coupled to one or more other components, such as one or more storage devices 606 (non-transitory machine-readable storage media), user input/output devices 610 (e.g., a keyboard, a touchscreen, and/or a display), and network connections. The coupling of the set of processors and other components is typically through one or more busses and bridges 602 (also termed as bus controllers). Thus, the storage device of a given electronic device typically stores code and/or data for execution on the set of one or more processors 603 of that electronic device. Of course, one or more parts of an embodiment of the invention may be implemented using different combinations of software, firmware, and/or hardware.

Alternative Embodiments

While embodiments of the invention has been described in relation to a simplified e-tree service network, the methods described herein applies to other more complex e-tree service network with any number of network elements and any number of root and leaf access circuits attached to each provider's edge network elements. Therefore, embodiments of the invention are not limited to the simplified e-tree service network illustrated in FIG. 1. Furthermore, it should be understood that the methods described herein may be implemented in the software of a network element, or in the hardware of the network element, or a combination of both. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first edge network element in an e-tree service network, wherein the first edge network element is coupled to a second edge network element through a set of pseudowires including a root pseudowire for carrying packets that are sent from a root network element in the e-tree service network and a leaf pseudowire for carrying packets that are sent from a leaf network element in the e-tree service network, and wherein the first edge network element includes a plurality of logical ports including a first logical port associated with the root pseudowire, a second logical port associated with the leaf pseudowire, and a third logical port associated with a leaf access circuit that is coupled to a local leaf network element, the method comprising the steps of:

responsive to receiving a first packet with a first source Media Access Control (MAC) address and a first destination MAC address on the first logical port associated with the root pseudowire, performing the following steps:

associating, in a root pseudowire MAC address table, the first source MAC address with the first logical port that is associated with the root pseudowire, and associating, in a leaf pseudowire MAC address table, the first source MAC address with the second logical port that is associated with the leaf pseudowire;

responsive to receiving a second packet with a second source MAC address and a second destination MAC address on the second logical port associated with the leaf pseudowire, associating, in the root pseudowire MAC address table, the second source MAC address with the first logical port that is associated with the root pseudowire;

receiving a third packet with a third source MAC address and a third destination MAC address on the third logical port associated with the leaf access circuit; and responsive to determining that the third destination MAC address is in the leaf pseudowire MAC address table, forwarding the third packet out on a logical port that is associated with the third destination MAC address as indicated in the leaf pseudowire MAC address table.

2. The method of claim 1, further comprising:

receiving a fourth packet with a fourth source MAC address and a fourth destination MAC address on the third logical port associated with the leaf access circuit;

responsive to determining that the fourth destination MAC address is not in the leaf pseudowire MAC address table and is in the root pseudowire MAC address table, dropping the fourth packet.

3. The method of claim 1, further comprising:

responsive to receiving the third packet on the third logical port associated with the leaf access circuit, associating, in the root pseudowire MAC address table, the third source MAC address with the third logical port that is associated with the leaf access circuit.

4. The method of claim 2, wherein the plurality of logical ports further includes a fourth logical port associated with a root access circuit that is coupled to a local root network element, the method further comprises:

responsive to receiving a fifth packet with a fifth source MAC address and a fifth destination MAC address on the fourth logical port that is associated with the root access circuit, performing the following steps:

associating, in the root pseudowire MAC address table, the fifth source MAC address with the fourth logical port that is associated with the root access circuit; and associating, in the leaf pseudowire MAC address table, the fifth source MAC address with the fourth logical port that is associated with the root access circuit.

5. The method of claim 4, further comprising:

receiving a sixth packet with a sixth source MAC address and a sixth destination MAC address on the third logical port associated with the leaf access circuit; and responsive to determining that the sixth destination MAC address is not in the leaf pseudowire MAC address table and is not in the root pseudowire MAC address table, broadcasting the sixth packet out the second logical port onto the leaf pseudowire towards the second edge network element and out the fourth logical port onto the root access circuit towards the local root network element.

6. The method of claim 4, further comprising:

receiving a sixth packet with a sixth source MAC address and a sixth destination MAC address on the fourth logical port associated with the root access circuit; and responsive to determining that the sixth destination MAC address is in the root pseudowire MAC address table, forwarding the sixth packet out on a logical port that is associated with the sixth destination MAC address as indicated in the root pseudowire MAC address table.

7. The method of claim 4, further comprising:

receiving a sixth packet with a sixth source MAC address and a sixth destination MAC address on the fourth logical port associated with the root access circuit; and responsive to determining that the sixth destination MAC address is not in the root pseudowire MAC address table, broadcasting the sixth packet out the first logical port onto the root pseudowire towards the second edge network element and out the third logical port onto the leaf access circuit towards the local leaf network element.

8. The method of claim 1, further comprising:

responsive to receiving the second packet on the second logical port associated with the leaf pseudowire, performing the following step:

associating, in the leaf pseudowire MAC address table, the second source MAC address with a discard indicator;

receiving a fourth packet with a fourth source MAC address and a fourth destination MAC address on the third logical port associated with the leaf access circuit;

responsive to determining that the fourth destination MAC address is in the leaf pseudowire MAC address table and is associated with a discard indicator, dropping the fourth packet.

9. The method of claim 8, further comprising:

receiving a fifth packet with a fifth source MAC address and a fifth destination MAC address on the third logical port associated with the leaf access circuit; and responsive to determining that the fifth destination MAC address is not in the leaf pseudowire MAC address table, broadcasting the fifth packet out the second logical port onto the leaf pseudowire towards the second edge network element and out the fourth logical port onto the root access circuit towards the local root network element.

10. An edge network element in an e-tree service network, the edge network element comprising:

a set of one or more processors;

a non-transitory machine readable storage medium, coupled with the set of processors, storing instructions that when executed by the set of processors, cause the set of processors to perform the following:

receive a first packet with a first source MAC address and a first destination MAC address on a first logical port associated with a root pseudowire that is to couple the edge network element with another edge network element of the e-tree service, wherein the root pseudowire is for carrying packets that are sent from a root network element in the e-tree service network;

associate, in a root pseudowire MAC address table, the first source MAC address with the first logical port that is associated with the root pseudowire;

associate, in a leaf pseudowire MAC address table, the first source MAC address with a second logical port associated with a leaf pseudowire that is to couple the edge network element with the another edge network element, wherein the leaf pseudowire is for carrying packets that are sent from a leaf network element in the e-tree service network;
receive a second packet with a second source MAC address and a second destination MAC address on the second logical port associated with the leaf pseudowire;
associate, in the root pseudowire MAC address table, the second source MAC address with the first logical port that is associated with the root pseudowire;
receive a third packet with a third source MAC address and a third destination MAC address on a third logical port associated with a leaf access circuit that is to couple the edge network element with a local leaf network element; and
responsive to determining that the third destination MAC address is in the leaf pseudowire MAC address table, forward the third packet out on a logical port that is associated with the third destination MAC address as indicated in the leaf pseudowire MAC address table.

11. The edge network element of claim 10, wherein the instructions, when executed by the set of processors, cause the set of processors to further perform the following:
receive a fourth packet with a fourth source MAC address and a fourth destination MAC address on the third logical port associated with the leaf access circuit;
responsive to determining that the fourth destination MAC address is not in the leaf pseudowire MAC address table and is in the root pseudowire MAC address table, drop the fourth packet.

12. The edge network element of claim 10, wherein the instructions, when executed by the set of processors, cause the set of processors to further perform the following:
responsive to receiving the third packet on the third logical port associated with the leaf access circuit, associate, in the root pseudowire MAC address table, the third source MAC address of the third packet with the third logical port that is associated with the leaf access circuit.

13. The edge network element of claim 11, wherein the instructions, when executed by the set of processors, cause the set of processors to further perform the following:
receive a fifth packet with a fifth source MAC address and a fifth destination MAC address on a fourth logical port associated with a root access circuit that is to couple the edge network element with a local root network element;
associate, in the root pseudowire MAC address table, the fifth source MAC address with the fourth logical port that is associated with the root access circuit; and
associate, in the leaf pseudowire MAC address table, the fifth source MAC address with the fourth logical port that is associated with the root access circuit.

14. The edge network element of claim 13, wherein the instructions, when executed by the set of processors, cause the set of processors to further perform the following:
receive a sixth packet with a sixth source MAC address and a sixth destination MAC address on the third logical port associated with the leaf access circuit; and
responsive to determining that the sixth destination MAC address is not in the leaf pseudowire MAC address table and is not in the root pseudowire MAC address table, broadcast the sixth packet out the second logical port onto the leaf pseudowire towards the another edge network element and out the fourth logical port onto the root access circuit towards the local root network element.

15. The edge network element of claim 13, wherein the instructions, when executed by the set of processors, cause the set of processors to further perform the following:
receiving a sixth packet with a sixth source MAC address and a sixth destination MAC address on the fourth logical port associated with the root access circuit; and
responsive to determining that the sixth destination MAC address is in the root pseudowire MAC address table, forward the sixth packet out on a logical port that is associated with the third destination MAC address as indicated in the root pseudowire MAC address table.

16. The edge network element of claim 13, wherein the instructions, when executed by the set of processors, cause the set of processors to further perform the following:
receiving a sixth packet with a sixth source MAC address and a sixth destination MAC address on the fourth logical port associated with the root access circuit; and
responsive to determining that the sixth destination MAC address is not in the root pseudowire MAC address table, broadcast the sixth packet out the first logical port onto the root pseudowire towards the another edge network element and out the third logical port onto the leaf access circuit towards the local leaf network element.

17. The edge network element of claim 10, wherein the instructions, when executed by the set of processors, cause the set of processors to further perform the following:
responsive to receiving the second packet on the second logical port associated with the leaf pseudowire, associate, in the leaf pseudowire MAC address table, the second source MAC address with a discard indicator;
receive a fourth packet with a fourth source MAC address and a fourth destination MAC address on the third logical port associated with the leaf access circuit;
responsive to determining that the fourth destination MAC address is in the leaf pseudowire MAC address table and is associated with a discard indicator, drop the fourth packet.

18. The edge network element of claim 17, wherein the instructions, when executed by the set of processors, cause the set of processors to further perform the following:
receive a fifth packet with a fifth source MAC address and a fifth destination MAC address on the third logical port associated with the leaf access circuit; and
responsive to determining that the fifth destination MAC address is not in the leaf pseudowire MAC address table, broadcast the fifth packet out the second logical port onto the leaf pseudowire towards the another edge network element and out the fourth logical port onto the root access circuit towards the local root network element.

19. An apparatus comprising:
a network element, including hardware and software, to be coupled in an e-tree service network, the network element comprising:
a learning module configured to:
capture source MAC addresses of packets received on the logical ports of the network element, and
associate the source MAC addresses with the logical ports of the network element in a root pseudowire MAC address table and a leaf pseudowire MAC address table based on a set of port association rules that includes at least one rule that associates a particular logical port with a particular source MAC address without receiving a packet with that particular source MAC address on that particular logical port wherein the root pseudowire Media Access Control (MAC) address table is configured to store a first set of associations between logical ports of the network element and MAC addresses of the other network elements in the e-tree service network, and wherein the leaf pseudowire MAC address table is configured to store a second set of associations between the logical ports of the network element and the MAC address of the other network elements in the e-tree service network; and a forwarding module to access the root pseudowire MAC address table and the leaf pseudowire MAC address table, the forwarding module configured to:

look up destination MAC addresses of the packets received at the network element in at least one of the pseudowire MAC address tables; and determine whether to forward or to discard each of the packets based on at least one of the first and second set of associations stored in the pseudowire MAC address tables.

20. The network element of claim 19, wherein the set of port association rules includes:

for each packet received on a first logical port associated with a root pseudowire that couples the network element with another network element in the e-tree service:

associate, in the root pseudowire MAC address table, that packet's source MAC address with the first logical port that is associated with the root pseudowire; and associate, in the leaf pseudowire MAC address table, that packet's source MAC address with a second logical port associated with a leaf pseudowire that couples the network element with the another network element in the e-tree service.

21. The network element of claim 20, wherein the set of port association rules further includes:

for each packet received on the second logical port associated with the leaf pseudowire:

associate, in the root pseudowire MAC address table, that packet's source MAC address with the first logical port that is associated with the root pseudowire.

22. The network element of claim 21, wherein the set of port association rules further includes:

for each packet received on a third logical port associated with a leaf access circuit that couples the network element to a local leaf network element in the e-tree service:

associate, in the root pseudowire MAC address table, that packet's source MAC address with the third logical port that is associated with the leaf access circuit.

23. The network element of claim 22, wherein the set of port association rules includes:

for each packet received on a fourth logical port associated with a root access circuit that couples the network element with a local root network element in the e-tree service:

associate, in the root pseudowire MAC address table, that packet's source MAC address with the fourth logical port that is associated with the root access circuit; and associate, in the leaf pseudowire MAC address table, that packet's source MAC address with the fourth logical port that is associated with the root access circuit.

24. The network element of claim 23, wherein the forwarding module is configured to:

for each packet received on the second logical port associated with the leaf pseudowire or on the third logical port associated with the leaf access circuit:

discard that packet if that packet's destination MAC address is in the root pseudowire MAC address table and not in the leaf pseudowire MAC address table.

25. The network element of claim 23, wherein forwarding module is configured to:

for each packet received on the second logical port associated with the leaf pseudowire or on the third logical port associated with the leaf access circuit:

broadcast that packet on the fourth logical port associated with the root access circuit if that packet's destination MAC address is not in the root pseudowire MAC address table and not in the leaf pseudowire MAC address table.

26. The network element of claim 23, wherein forwarding module is configured to:

for each packet received on the third logical port associated with the leaf access circuit:

broadcast that packet on the second logical port associated with the leaf pseudowire and on the fourth logical port associated with the root access circuit if that packet's destination MAC address is not in the root pseudowire MAC address table and not in the leaf pseudowire MAC address table.

27. The network element of claim 20, wherein the set of port association rules further includes:

for each packet received on the second logical port associated with the leaf pseudowire:

associate, in the root pseudowire MAC address table, that packet's source MAC address with the first logical port that is associated with the root pseudowire; and associate, in the leaf pseudowire MAC address table, that packet's source MAC address with a first discard indicator; and for each packet received on a third logical port associated with a leaf access circuit that couples the network element to a local leaf network element in the e-tree service:

associate, in the root pseudowire MAC address table, that packet's source MAC address with the third logical port that is associated with the leaf access circuit; and associate, in the leaf pseudowire MAC address table, that packet's source MAC address with a second discard indicator.

28. The network element of claim 27, wherein forwarding module is configured to:

for each packet received on the second logical port associated with the leaf pseudowire or on the third logical port associated with the leaf access circuit:

broadcast that packet on the fourth logical port associated with the root access circuit if that packet's destination MAC address is not in the leaf pseudowire MAC address table.

* * * * *

UNITED STATES PATENT AND TRADEMARK OFFICE
CERTIFICATE OF CORRECTION

PATENT NO. : 8,537,810 B2
APPLICATION NO. : 13/251167
DATED : September 17, 2013
INVENTOR(S) : Sinicrope Page 1 of 1

It is certified that error appears in the above-identified patent and that said Letters Patent is hereby corrected as shown below:

In the Specification

In Column 4, Line 67, delete "Voice Over Internet Protocol (VOIP)" and insert -- Voice over Internet Protocol (VoIP) --, therefor.

In Column 7, Line 43, delete "of" and insert -- of. --, therefor.

In Column 10, Line 8, delete "root PW 102" and insert -- root PW 101 --, therefor.

Signed and Sealed this
Fourth Day of February, 2014

Michelle K. Lee
*Deputy Director of the United States Patent and Trademark Office*